US005597639A

United States Patent [19]

Schulz

[11] Patent Number: 5,597,639

[45] Date of Patent: *Jan. 28, 1997

[54] HIGH SOFTNESS EMBOSSED TISSUE

[75] Inventor: Galyn A. Schulz, Appleton, Wis.

[73] Assignee: James River Corporation of Virginia, Richmond, Va.

[ * ] Notice: The term of this patent shall not extend beyond the expiration date of Pat. No. 5,436,057.

[21] Appl. No.: 169,628

[22] Filed: Dec. 20, 1993

Related U.S. Application Data

[63] Continuation-in-part of Ser. No. 999,414, Dec. 24, 1992, Pat. No. 5,436,057.

[51] Int. Cl.$^{6}$ .............................. D04H 1/64; B32B 31/20

[52] U.S. Cl. .......................... 428/156; 428/338; 428/220; 428/215; 428/213; 428/152; 428/153; 428/154; 428/162; 428/163; 428/165; 428/167; 428/171; 428/172; 428/174; 428/179; 428/175; 428/181; 428/187; 428/537.5; 428/906; 162/117; 162/118; D5/39; D5/37; D5/53; D5/58

[58] Field of Search .................................... 428/338, 220, 428/215, 213, 152, 153, 154, 156, 162, 163, 165, 167, 171, 172, 174, 179, 175, 181, 187, 537.5, 906; 162/117, 118; D5/39, 37, 53, 58

[56] References Cited

U.S. PATENT DOCUMENTS

| | | | |
|---|---|---|---|
| D. 40,254 | 9/1909 | Zschaemisch | D5/99 |
| D. 63,343 | 11/1923 | Vandergaw et al. | D5/57 |
| D. 64,690 | 5/1924 | Schwarz | D5/37 |
| D. 77,398 | 1/1929 | De Lancy | D5/59 |
| D. 117,018 | 10/1939 | Turpan | D5/37 |
| D. 154,696 | 8/1949 | Mitschke | D5/37 |
| D. 167,528 | 8/1952 | Odzer | D5/37 |
| D. 179,699 | 2/1957 | Sadinoff | D5/39 |
| D. 184,493 | 2/1959 | Scheiding | D5/57 |
| D. 184,878 | 4/1959 | Korkovius | D5/53 |
| D. 213,661 | 3/1969 | Hicks | D5/59 |
| D. 231,021 | 3/1974 | Gilling et al. | D5/59 |
| D. 239,137 | 3/1976 | Appleman | D5/53 |
| D. 288,150 | 2/1987 | Schulz et al. | D5/53 |
| D. 298,588 | 11/1988 | Peddada | D5/57 |
| D. 319,349 | 8/1991 | Schultz et al. | D5/53 |
| 496,964 | 5/1893 | Wheeler | D5/53 |
| 497,421 | 5/1893 | Wheeler | D5/57 |
| 2,121,013 | 6/1938 | Brown | 428/181 |
| 2,954,838 | 10/1960 | Nuorivaara | 116/156 |
| 3,240,656 | 3/1966 | Faircloth | 428/175 |
| 4,307,141 | 12/1981 | Walbrun | 428/178 |
| 4,320,162 | 3/1982 | Schulz | 428/154 |
| 4,339,088 | 7/1982 | Niedermeyer | 242/1 |
| 4,483,728 | 11/1984 | Bauernfeind | 428/172 |
| 4,659,608 | 4/1987 | Schulz | 428/906 |
| 4,759,967 | 7/1988 | Bauernfiend | 428/154 |
| 4,803,032 | 2/1989 | Schulz | 162/117 |
| 4,927,588 | 5/1990 | Schulz | 162/117 |
| 5,158,819 | 10/1992 | Goodman, Jr. et al. | 428/131 |
| 5,300,347 | 4/1994 | Underhill et al. | 428/171 |

*Primary Examiner*—William Watkins
*Attorney, Agent, or Firm*—Finnegan, Henderson, Farabow, Garrett & Dunner, L.L.P.

[57] ABSTRACT

The perceived softness of embossed tissue can be increased greatly while avoiding nesting when a particular pattern is embossed into the tissue. This pattern combines relatively shallow stitchlike bosses with deeper more sharply defined signature bosses. The stitchlike bosses can be rounded and arranged in wavy flowing intersecting lines. The signature bosses can be arranged in regions framed by the intersecting wavy flowing lines.

69 Claims, 14 Drawing Sheets

HIGH SOFTNESS EMBOSSED TISSUE

This application is a continuation in part of Ser. No. 999,414 filed Dec. 24, 1992 now U.S. Pat. No. 5,436,057.

BACKGROUND

1. Field of the Invention

The invention relates to a specifically embossed web or sheet exhibiting a high perceived softness. The invention further relates to a roll of embossed tissue. The embossed tissue of the invention results in superior overall appearance of the product as well as a consumer perception of improved softness. The embossed tissue of the present invention also results in a more uniform roll of tissue.

2. Background of the Invention

Tissue produced using conventional wet press technology must usually be embossed subsequent to creping to improve bulk, appearance and perceived softness. It is known in the art to emboss sheets comprising multiple plies of creped tissue to increase the surface area of the sheets thereby enhancing their bulk and moisture holding capacity. Toilet tissue is usually marketed in rolls, containing a specified number of sheets per roll. Tissue embossed in conventional patterns of spot debossments, when packaged in roll form, exhibit a tendency to be non-uniform in appearance often due to uneven buildup of the bosses as the sheet is wound onto the roll, resulting in a ridging effect detracting from the appearance of the rolls.

Prior art embossing patterns and methods of forming them have been set forth which emboss products in a manner selected to avoid nesting of the bosses in rolled, folded or stacked sheets of paper product by various means. For one example of such a pattern and method, see U.S. Pat. No. 4,659,608. This prior art pattern while improving the nesting problem associated with previous prior art patterns, to only four locations, was faced with a spiralling effect similar to the visual spinning of a barber shop pole. In addition, this prior art pattern has stresses placed upon the boss pattern causing it to wrinkle and ridge.

A primary advantage of the present invention is to provide an embossed tissue which avoids buildup and ridging problems while heightening the consumer's perception of softness. The pattern which is formed in the tissue of the present invention may be formed by debossing or embossing. When an emboss pattern is formed, the reverse side of the sheet retains a deboss pattern. The projections which are formed are referred to as bosses. When a deboss pattern is formed, the reverse side of the sheet retains an emboss pattern and the projections are still referred to as bosses. Thus, the methodologies may be interchanged while producing the same product.

The product according to the present invention may include stitch-like bosses, signature bosses and/or finishing bosses. Signature bosses may be made up of any embossing design. They are most often a design which may be related by consumer perception to the particular manufacturer of the tissue.

Finishing bosses may also be made up of any embossing design. They too may be related by consumer perception to a specific manufacturer. The finishing bosses function in essentially the same manner regardless of the aesthetic design. Preferred aesthetic finishing bosses include cross-stitches, patchwork, hearts, flowers and the like.

According to the present invention, when the web or sheets are formed into a roll, the tissue is aligned so that the bosses are internal to the roll and the debossed side of the tissue is exposed.

In one embodiment of the present invention, the boss pattern combines relatively shallow stitchlike bosses with deeper more sharply defined signature bosses. The overall arrangement of the pattern is selected so that, even though each sheet or web is embossed heavily in the signature bosses, when the sheets are formed into a roll, the signature bosses fully overlap at a maximum of two locations in the roll, the outermost of these being at least a predetermined distance, e.g. about an eighth of an inch, inward from the exterior surface of the roll. Moreover, the overall average boss density is substantially uniform in the machine direction of each strip in the roll. The combined effect of this arrangement is that the rolls possess very good roll structure and do not exhibit the ridging effect found with prior art embossed tissue patterns.

In another embodiment of the present invention, a finishing boss is also included which is more shallow than the aforementioned stitchlike boss.

This invention further relates to the discovery that the perceived softness of embossed tissue can be increased greatly if a particular pattern is embossed into the tissue. This pattern combines bosses formed by relatively shallow stitchlike embossments or debossments with bosses formed by deeper more sharply defined embossments or debossments. When viewing the tissue from the debossed side, the shallow, stitchlike bosses are positioned to give a "puffy" quilted appearance to the areas defined by them, creating both actual shading and the illusion of shading as would be seen in a quilt having chambers filled with fiber or down. This appearance results from the use of stitchlike bosses which may be rounded and which are arranged in intersecting lines, preferably wavy flowing lines, both to simulate the appearance of stitches of a quilt as well as to distort the actual shape of the quilt so that the shape and appearance cooperate to reinforce the "quiltlike" appearance. The preferred waviness of the lines simulates the appearance of stitching displaced from straight lines by the filling in the quilt while creating the appearance of shading resulting from a three dimensional shape. In addition, the wavy flowing lines of these stitchlike bosses actually distort the sheet producing a shape resembling the surface of a filled quilt.

Signature and finishing bosses in regions framed by the intersecting flowing lines serve to greatly enhance the bulk of the tissue while also enhancing the distortion of the surface thereof. The signature bosses are continuous rather than stitchlike, can preferably be elongate, and are embossed or debossed to significantly greater depth and have more sharply defined boundaries than the bosses defining the wavy flowing lines. The finishing bosses are continuous or stitchlike and are embossed or debossed to less depth than the bosses defining the wavy lines. In addition, the signature bosses further enhance the puffy or filled appearance of the sheet both by creating the illusion of shading as well as by creating actual shading due to displacement of the sheet apparently caused by puckering of surrounding regions due to the heavy embossing or debossing given to the signature.

SUMMARY OF THE INVENTION

Further advantages of the invention will be set forth in part in the description which follows and in part will be apparent from the description, or may be learned by practice of the invention. The advantages of the invention may be realized and attained by means of the instrumentalities and combinations particularly pointed out in the appended claims.

To achieve the foregoing advantages and in according with the purpose of the invention, as embodied and broadly described herein, there is disclosed:

A nonwoven fibrous web having a machine direction and a cross direction, with the machine direction extending substantially parallel to a free edge of the web, and having a plurality of bosses formed therein comprising;

a pattern which is made up of uniform stitchlike bosses to form polygonal cells which make up a lattice structure; and a pattern which is made up of signature bosses which fill at least some of the cells;

wherein the combination of lattice structure and signature bosses are offset from the machine direction.

There is further disclosed:

A nonwoven fibrous web having a plurality of bosses formed therein comprising:

a foreground pattern which is made up of uniform bosses to form polygonal cells; and a background pattern which is made up of signature bosses which fill at least some of the cells.

There is further disclosed:

A non woven fibrous web having a lattice pattern defined by an array of stitchlike bosses which have a predetermined height, are encompassed by downwardly flaring regions, and form a plurality of polygonal cells, a substantial fraction, less than all, of said polygonal cells having therein a signature boss having a height exceeding that of said stitchlike bosses and being encompassed by a downwardly flaring region more steeply inclined than the downwardly flaring regions of said stitchlike bosses.

There is further disclosed:

A sheet of tissue having a plurality of bosses formed therein defining a lattice pattern comprising a plurality of polygonal cells, a fraction, more than one-third but less than two-thirds, of said polygonal cells having therein a signature boss, said lattice pattern is defined by an array of stitchlike bosses arranged to form said lattice pattern, wherein said stitchlike bosses are encompassed by arcuate regions having a cross-sectional radii of curvature exceeding a predetermined value or said signature boss having a height exceeding the height of said stitchlike bosses.

There is further disclosed:

A sheet of tissue having a plurality of bosses formed therein defining a lattice pattern having a plurality of polygonal cells, a fraction, more than one-third but less than two-thirds, of said polygonal cells being filled with a signature boss, said lattice pattern being defined by a sinuous gracile array of stitchlike bosses undulating about the generators of said lattice pattern, said stitchlike bosses being encompassed by rotund arcuate regions having cross-sectional radii of curvature exceeding at least about 0.015 inch; said signature being comprised of a plurality of elongated bosses having a height of boss exceeding the height of boss of said stitchlike bosses by at least 0.003 inch, said elongate bosses being encompassed by arcuate regions having cross-sectional radii of curvature of the arcuate regions encompassing said stitchlike bosses.

There is still further disclosed:

A roll of embossed tissue having a plurality of bosses formed therein, said bosses comprising:

two series of intersecting sinuous lines of stitchlike bosses, one series of lines being disposed at a first acute angle clockwise of the machine direction of the roll, the other series of lines being disposed at a second acute angle counterclockwise of the machine direction of the roll whereby a repeating pattern comprising an oblique lattice of substantially uniform staggered wavy diamonds is defined;

a plurality of signature bosses centrally located within alternating rows of said diamond, the disposition of said bosses being configured such that substantial nesting of said signature bosses on said rolls occurs at a maximum of two locations on said roll, the outermost of said locations being spaced at least 1/32 inch below the exterior surface of said roll and, the innermost, at least 0.5 inch inward from said outermost substantial nesting location.

There is still further disclosed:

A roll of embossed tissue having a plurality of bosses formed therein, said bosses comprising:

two equally spaced series of intersecting sinuous lines of stitchlike bosses, one series of lines being disposed at a first acute angle clockwise of the machine direction of the roll, the other series of lines being disposed at a second acute angle counterclockwise of the machine direction of the roll whereby an oblique lattice of substantially uniform staggered wavy diamonds is defined;

a plurality of signature bosses centrally located within alternating rows of said diamond, the disposition of said bosses being configured such that, adjacent to the surface of said roll, signature bosses on closely adjacent overlapping repeats are displaced from each other by at least 0.50 inch in the machine direction.

Additional advantages of the invention will be set forth in part in the description which follows, and in part will be apparent from the description, or may be learned by practice of the invention. The objects and advantages of the invention will be realized and attained by means of the elements and combination particularly pointed out in the appended claims.

The accompanying drawings, which are incorporated in and constitute a part of the specification, illustrate various aspects of the invention and, together with the description, serve to explain the principles of the invention.

BRIEF DESCRIPTION OF THE DRAWINGS

FIG. 1 is a photograph of several sheets of the present invention illustrating the realistic three dimensional quilted appearance of the tissue of one embodiment of the present invention.

DESCRIPTION OF THE PREFERRED EMBODIMENTS

Figure 5:
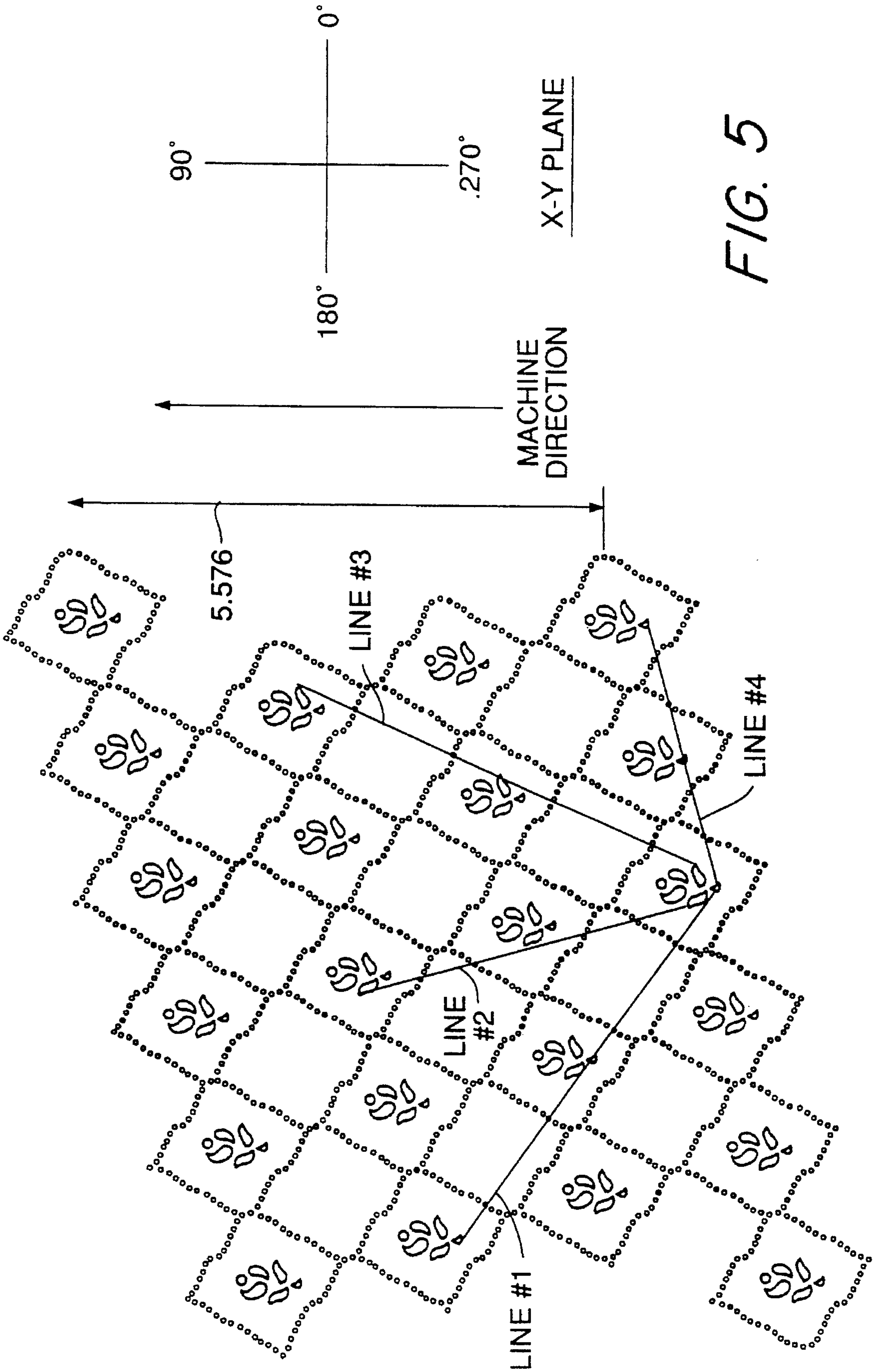
FIG. 5 is illustrative layout of the lattices and signature bosses in relation to the machine direction of the roll.

According to one embodiment of the present invention, a greatly enhanced perceived softness is provided by a tissue substrate having embossed therein a pattern which is comprised of two distinct elements, the first, an array of stitchlike bosses and the second, a signature boss. The stitchlike bosses preferably comprise rounded discontinuous structures that are embossed or debossed in the tissue substrate in a pattern having a horn-like upward flare in a pattern of, preferably rounded lines. The effect is a pattern, e.g. a diamond shape, having discontinuous curved, "wavy" lines. Superimposed over this pattern is a signature boss which appears inside the overlapping pattern of the stitchlike bosses. Thus, the signature bosses, e.g., tulips, are located within the stitchlike boss pattern, e.g., inside diamonds formed thereby.

In another embodiment of the present invention, finishing bosses also appear within the overlapping pattern of the stitchlike bosses. The spaces occupied by the finishing bosses are at least some of those left vacant by the signature bosses. In the present application, when describing the bosses "in front of" and "behind" refer to the depth of the boss pattern. A boss which is embossed to less depth is in front of a boss which is embossed to a greater depth. Further in the present application when referring to bosses in the foreground, these are bosses of less depth than those in the background.

Substrates for use in the present invention include toilet tissue. The paper substrates for forming the tissue are readily recognizable to the skilled artisan.

In one preferred embodiment of this invention, bosses are formed defining a lattice pattern having a plurality of polygonal cells, a fraction, less than all, preferably more than one third but less than two thirds, of the polygonal cells being filled with a signature boss, said lattice pattern being defined by a sinuous gracile array of stitchlike bosses undulating about the generators of the lattice pattern, the stitchlike bosses being encompassed by rotund, horn-like upwardly flaring, arcuate regions having cross-sectional radius of curvature exceeding at least about 0.015 inch, more preferably at least about 0.025 inch and most preferably at least about 0.050 inch; the signature being comprised of a plurality of elongate bosses having a height of boss exceeding the height of boss of the stitchlike bosses by at least 0.003 inch, more preferably at least 0.005 inch and most preferably about 0.007 inch, the elongate bosses being encompassed by horn-like upwardly flaring, arcuate regions having cross-sectional radii of curvature of not more than 50% of the average radius of curvature of the arcuate regions encompassing the stitchlike bosses, more preferably not more that 25% and most preferably not more than 15% thereof. The cells created by the pattern of stitchlike bosses frame the signature debossment.

In another embodiment of the present invention, finishing embosses may be placed in less than all or all of the polygonal of the cells not occupied by a signature boss.

In accordance with one embodiment of the present invention, the stitchlike bosses should have an area of less than 10% of the web or sheet, preferably 8%, more preferably 6%. The signature boss should have an area of less than 5% of the web or sheet, preferably less than 4%, more preferably less than 3%. The finishing bosses should have an area of less than 20%, preferably less than 15%, and more preferably less than 10%. The total percent area of bosses being less than about 35% of the web or sheet, preferably less than about 30%, more preferably less than about 20%.

According to one embodiment of the present invention, adjacent each side of each cell containing signature bosses are cells which do not contain signature bosses. Further, the width of the tissue sheet in this embodiment is approximately 3 polygonal cells wide. The length of the side walls of the polygonal cells is about 1.5 inches, more preferably 1.25 inches and most preferably 1.125 inches. In another embodiment, the cells which do not contain signature bosses contain finishing bosses.

The stitchlike bosses undulate about the generators of the polygonal cells. The center of the farthest stitchlike boss from the line generating the polygonal cell is a distance of at least 1 stitchlike boss diameter but no more than 3 stitchlike boss diameters. Stitchlike boss diameter as used herein refers to the widest cross-section of the stitchlike boss. The array of stitchlike bosses coincides with the generators at least 2 times between apices.

In one embodiment of the present invention, the stitchlike bosses are dashes. The dashes have an aspect ratio of less than 5, more preferably between 3 and 5.

The lattice can define polygonal cells of varying shape. Shapes which can be used in the present invention include diamond shaped cells, hexagonal cells or octagonal cells. Other cell shapes are readily recognizable to the skilled artisan. In a most preferred embodiment, the cells are diamond shaped.

In the present invention, the boss pattern is offset from the machine direction in the cross direction, the machine direction being parallel to the free edge of the web, by more than 0° to less than 180°, preferably more than 10° to less than 170°.

In another preferred embodiment, a roll of embossed tissue having a smooth exterior surface is provided by arranging the two classes of bosses formed in the tissue as follows: the first class of bosses comprises two series of intersecting sinuous lines of stitchlike bosses, one series of lines being disposed at a first acute angle clockwise of the machine direction of the roll between 15° and 30°, the other series of lines being disposed at a second acute angle counterclockwise of the machine direction of the roll between 45° and 65°, thereby forming as a repeating pattern an oblique lattice of substantially uniform staggered wavy diamonds. Alternate cross direction cells in these rolls are filled with signature bosses centrally located The disposition of the bosses is such that substantial nesting of the signature bosses on the rolls occurs at a maximum of two locations on the roll, the outermost of the locations being spaced at least 1/32 inch below the exterior surface of the roll, more preferably at least 1/16 inch below and most preferably at least 0.100 inch below, and, the innermost, at least 0.5 inch inward from the outermost substantial nesting location, more preferably at least 0.75 inch and most preferably at least 0.825 inch.

In still another preferred embodiment, between the outermost nesting location and the innermost nesting location, in at least 40% of the volume of said roll the signature bosses do not overlap each other, more preferably in at least 45% and most preferably in at least 50% thereof.

In another preferred embodiment, the signature bosses are about 0.060" in depth, while the stitchlike bosses are about 0.050" in depth. In another embodiment, the tissue also has finishing bosses which are about 0.040" in depth.

In a further embodiment there is provided a roll of embossed or debossed tissue having a plurality of bosses formed therein, the bosses having two equally spaced series of intersecting sinuous lines of stitchlike bosses, one series of lines being disposed at a first acute angle clockwise of the machine direction of the roll, the other series of lines being disposed at a second acute angle counterclockwise of the machine direction of the roll whereby an oblique lattice of substantially uniform staggered wavy diamonds is defined. The tissue further has a plurality of signature bosses centrally located within alternating rows of the diamonds, the disposition of the bosses being configured such that, adjacent to the surface of the roll, signature bosses on closely adjacent overlapping repeats are displaced from each other by at least 0.5 inch, more preferably by at least 0.75 inch and most preferably 1.0 inch.

In FIG. 1, several sheet of embossed tissue are illustrated. The pattern includes signature bosses, for example, but not required to be, in the shape of tulips which are included within a criss-cross pattern of wavy lines which define polygonal cells having a diamond shape. As can be seen from FIG. 1, the wavy lines are formed from stitchlike or dotlike bosses.

Figure 2:
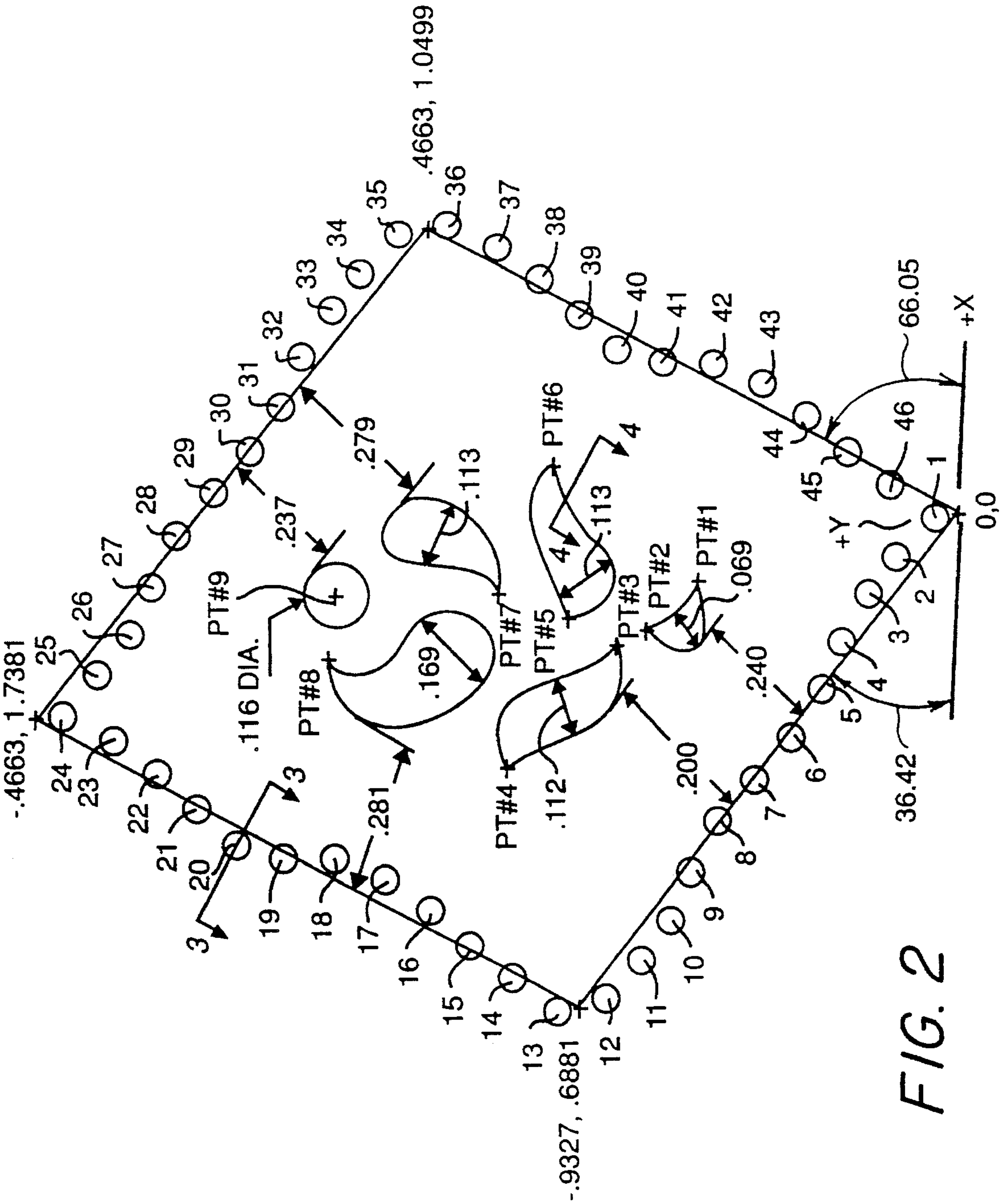
FIG. 2 is a plan view of the emboss pattern of a cell which carries a signature boss illustrating the location of each of the stitchlike emboss regions yielding the quilted puffy appearance.

FIG. 2 illustrates the actual pattern for formation of the embossed tissue depicted in FIG. 1. Views "A" and "B" set forth in FIG. 2 correspond to FIGS. 3 and 4, respectively. In FIG. 2, the numbered circles 1–46 define the stitchlike bosses which form the cells, as shown herein having a diamond pattern. As can be seen the bosses are carried inside, on and outside the solid lines or generators forming the diamond shape. This indicates the rounded or wavy shape that the lines take in FIG. 1.

The dots 1–46 in this embodiment correspond to the rectangular coordinates as set forth in Table 1 below:

TABLE 1

| DOT # | RECTANGULAR COORDINATES | DOT # | RECTANGULAR COORDINATES | DOT # | RECTANGULAR COORDINATES |
|---|---|---|---|---|---|
| 1 | −.0124, .0464 | 17 | −.7165, 1.0722 | 33 | .3094, 1.2166 |
| 2 | −.0880, .1136 | 18 | −.6868, 1.1699 | 34 | .3783, 1.1636 |
| 3 | −.1569, .1667 | 19 | −.6904, 1.2649 | 35 | .4539, 1.0963 |
| 4 | −.2469, .2179 | 20 | −.6701, 1.3554 | 36 | .4788, 1.0036 |
| 5 | −.3373, .2528 | 21 | −.6093, 1.4321 | 37 | .4402, .9070 |
| 6 | −.4248, .3063 | 22 | −.5485, 1.5113 | 38 | .3842, .8232 |
| 7 | −.5004, .3735 | 23 | −.4925, 1.5951 | 39 | .3234, .7440 |
| 8 | −.5853, .4410 | 24 | −.4539, 1.6917 | 40 | .2626, .6673 |
| 9 | −.6801, .4877 | 25 | −.3800, 1.6281 | 41 | .2423, .5768 |
| 10 | −.7681, .5225 | 26 | −.3018, 1.5724 | 42 | .2459, .4818 |
| 11 | −.8463, .5781 | 27 | −.2138, 1.5376 | 43 | .2162, .3841 |
| 12 | −.9202, .6418 | 28 | −.1190, 1.4910 | 44 | .1626, .2979 |
| 13 | −.9451, .7345 | 29 | −.0341, 1.4235 | 45 | .0995, .2187 |
| 14 | −.8892, .8231 | 30 | .0415, 1.3562 | 46 | .0435, .1349 |
| 15 | −.8332, .9069 | 31 | .1291, 1.3027 | | |
| 16 | −.7701, .9860 | 32 | .2195, 1.2678 | | |

Rectangular coordinates for points 1–9, which define the tulip pattern in this embodiment, are set forth in Table 2, below:

TABLE 2

| PT # | RECTANGULAR COORDINATES |
|---|---|
| 1 | −.1709, .4963 |
| 2 | −.2463, .5976 |
| 3 | −.2771, .6501 |
| 4 | −.4982, .8486 |
| 5 | −.2304, .7340 |
| 6 | .0467, .7845 |
| 7 | −.1884, .8766 |
| 8 | −.3286, 1.1910 |
| 9 | −.2135, 1.1849 |

As seen in FIG. 2, the signature bosses comprise a plurality of closed segments. Internal dimensions for the signature bosses and relative distances between the two types of bosses are given in FIG. 2.

The signature boss is separated from the stitchlike boss by at least 3 diameters of the stitchlike boss, more preferably 4, most preferably 5. In this embodiment of the invention, the stitchlike boss is shaped substantially like a dot. The diameter of the stitchlike boss is at least one and one half times the signature line width, more preferably at least twice the signature line width, and most preferably at least three times the signature line width.

The total stitchlike boss area in the tissue depicted in FIG. 2 is 0.0022 sq. inch and corresponds to 3.7% of the surface area of the pattern.

The total signature boss area in the tissue of FIG. 2 is 0.0683 sq. inch and corresponds to 2.6% of the surface area of the pattern.

The total surface area of the cell is 5.2007 sq. inches and the total surface area of pattern per cell area is 6.3%.

The internal angles of the polygonal cells in FIG. 2 are about 77° and about 103°.

Figure 3:
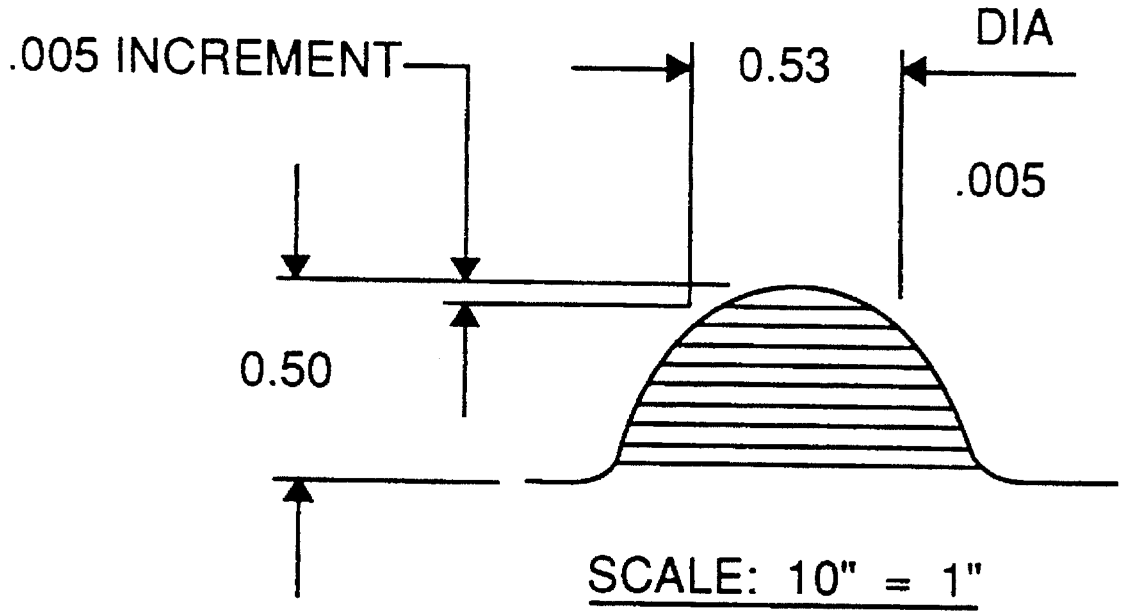
FIG. 3 is a cross-sectional view of a stitchlike boss.

FIG. 3 illustrates a cross-sectional view of a stitchlike bosses which form the cellular pattern. The diameter of the boss has been measured from the apex, in 0.005 inch increments to the depth of the boss of 0.050 inches. The diameters of the stitchlike boss are set forth in Table 3 below.

TABLE 3

| DPTH | SECTIONED DOT DIAMETER |
|---|---|
| .005 | .040 |
| .010 | .055 |
| .015 | .065 |
| .020 | .072 |
| .025 | .078 |
| .030 | .082 |
| .035 | .087 |
| .040 | .092 |
| .045 | .096 |

Figure 4:
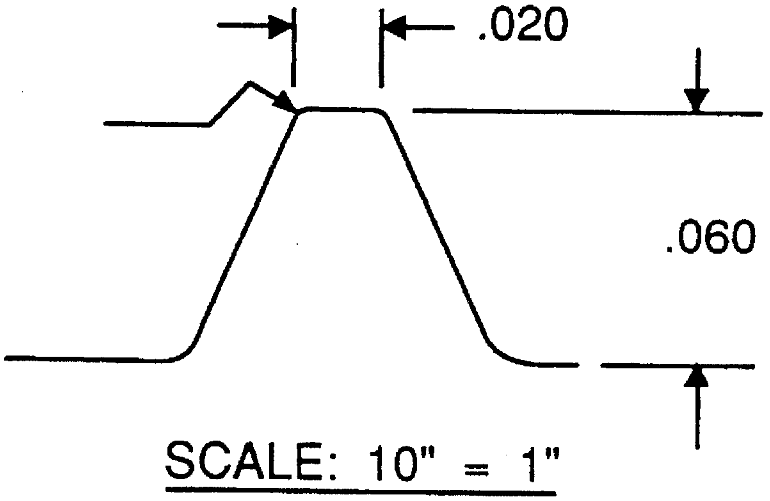
FIG. 4 is a cross-sectional view of a signature boss.
Figure 5:
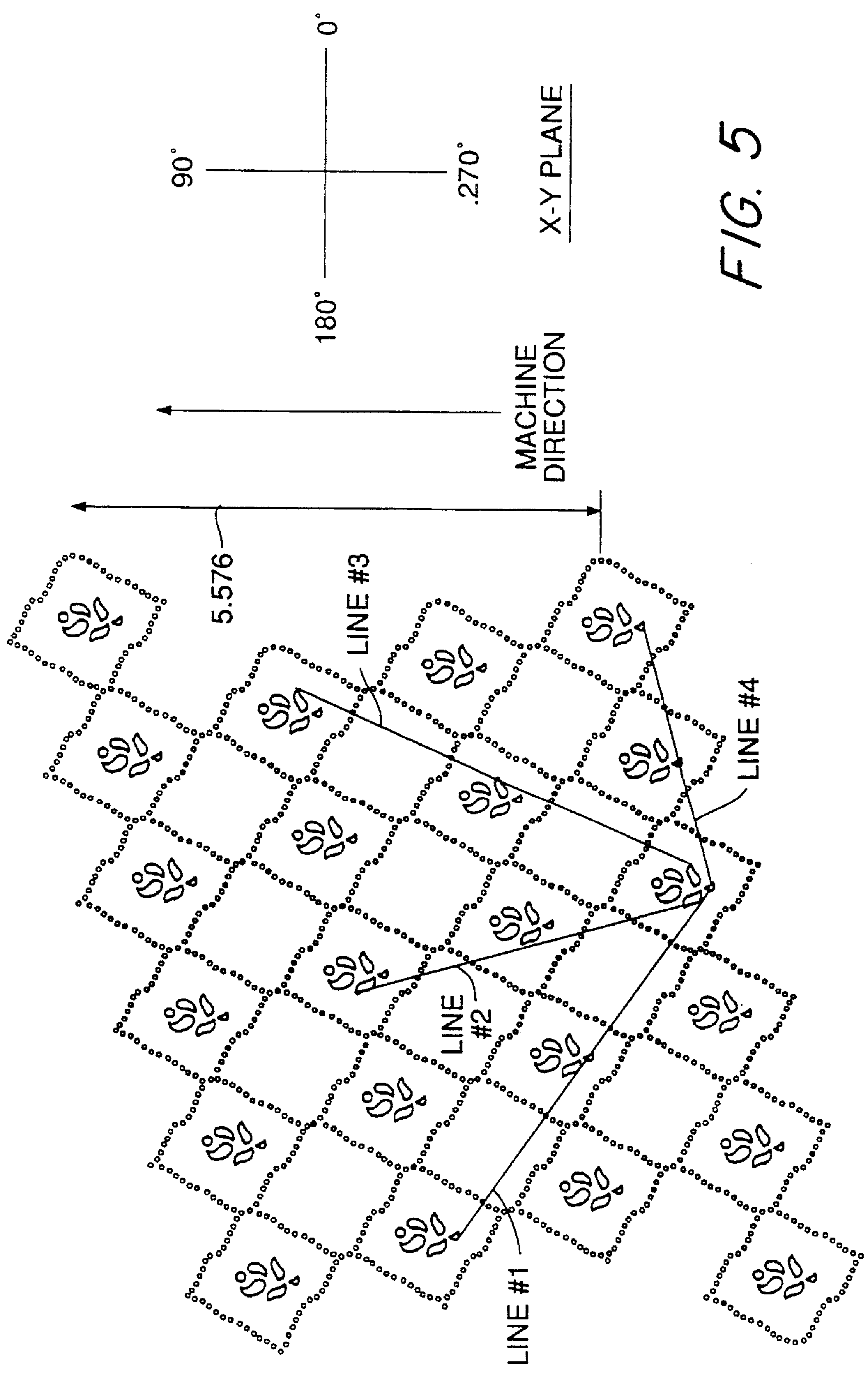

FIG. 4 illustrates a cross-sectional view of the signature boss pattern which is found internal the diamond pattern in FIG. 2. As can be seen from FIG. 4, the depth of debossment, and therefore, the height of the corresponding boss in a tissue is about 0.060 inches with an apex diameter of 0.020 inch.

FIG. 5 illustrates the pattern configuration relative to the machine direction of the roll. The measured angle of the lines relative to the machine direction are set forth in Table 4 below:

TABLE 4

| LINE NO. | ANGLE IN X–Y PLANE |
|---|---|
| #1 | 143.6° |
| #2 | 105.0° |
| #3 | 66.0° |
| #4 | 14.5° |

Line 1 and line 3 indicate not only the angle of the tulip pattern, as do lines 2 and 4, but also indicate the angle of the generators which define the sinuous criss-cross pattern.

The angle of line 1, relative to the machine direction, is preferably between 45° and 65°, more preferably 54°.

The angle of line 2, relative to the machine direction, is adjusted accordingly and in the preferred embodiment it is 15°.

The angle of line 3, relative to the machine direction, is preferably between 15° and 30°, more preferably 24°.

The angle of line 4, relative to the machine direction is adjusted accordingly and in the preferred embodiment, it is 75.5°.

Figure 6:
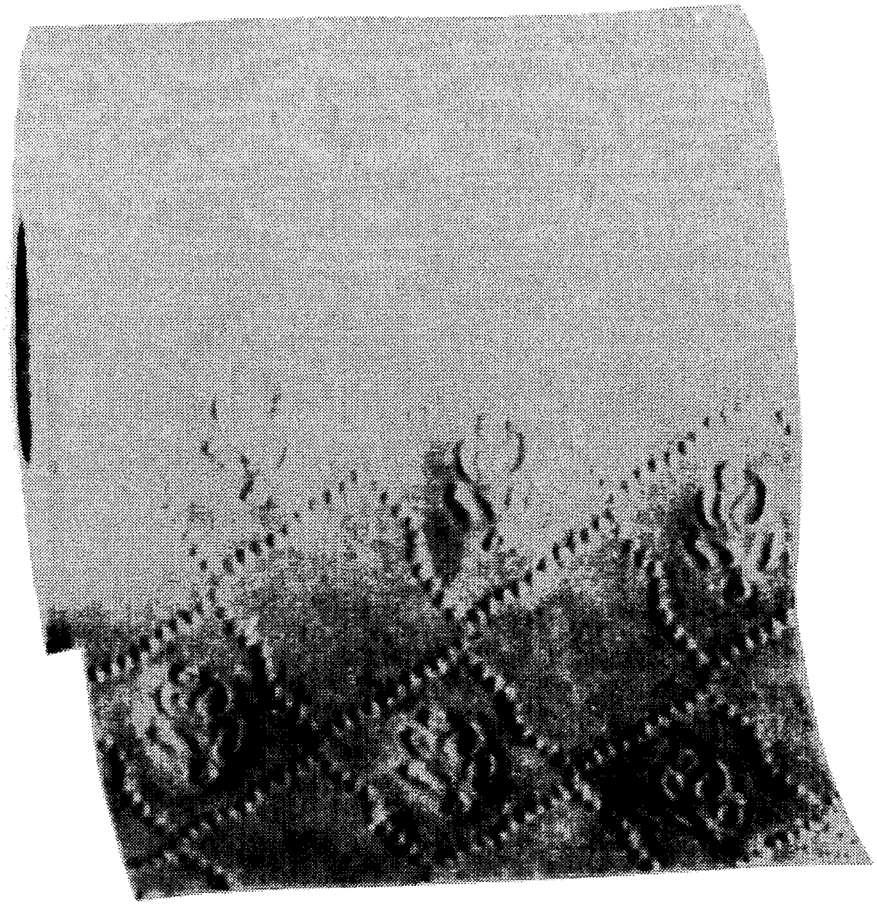
FIG. 6 is a photograph illustrating the roll structure resulting from the use of a preferred pattern of the present invention which is free from "ridging" observed with prior art patterns.

FIG. 6 is a photograph illustrating one pattern of the present invention in a roll structure.

Figure 7:
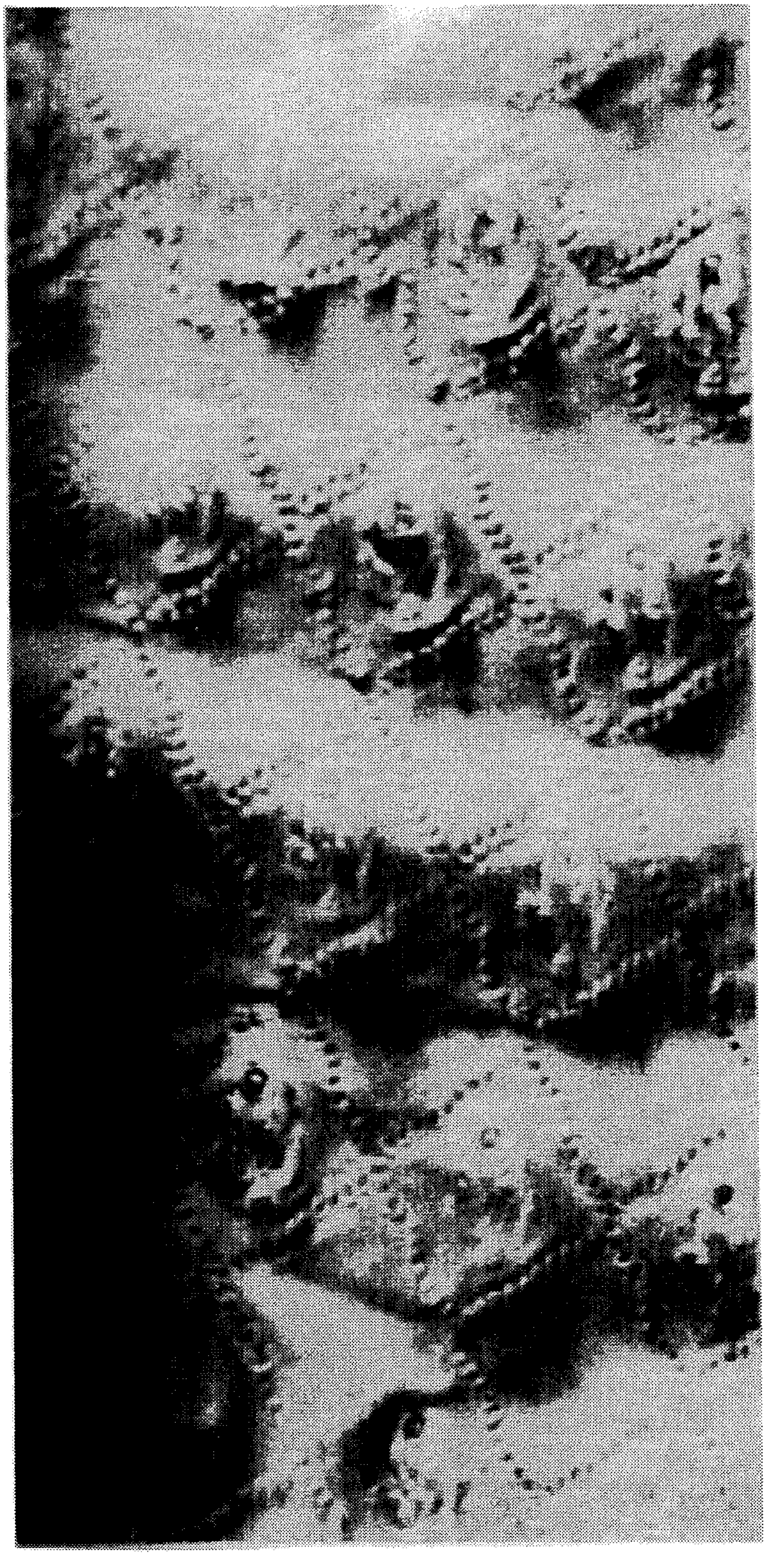
FIG. 7 is a photograph of a single tissue sheet showing the sinuous or "wavy" shape thereof.

FIG. 7 is a photograph of a tissue product embossed with one pattern described herein, and shows the wavy appearance caused by the rounded upwardly flaring region surrounding the stitchlike and signature bosses and the effect of this embossing on the tissue substrate.

Figure 8:
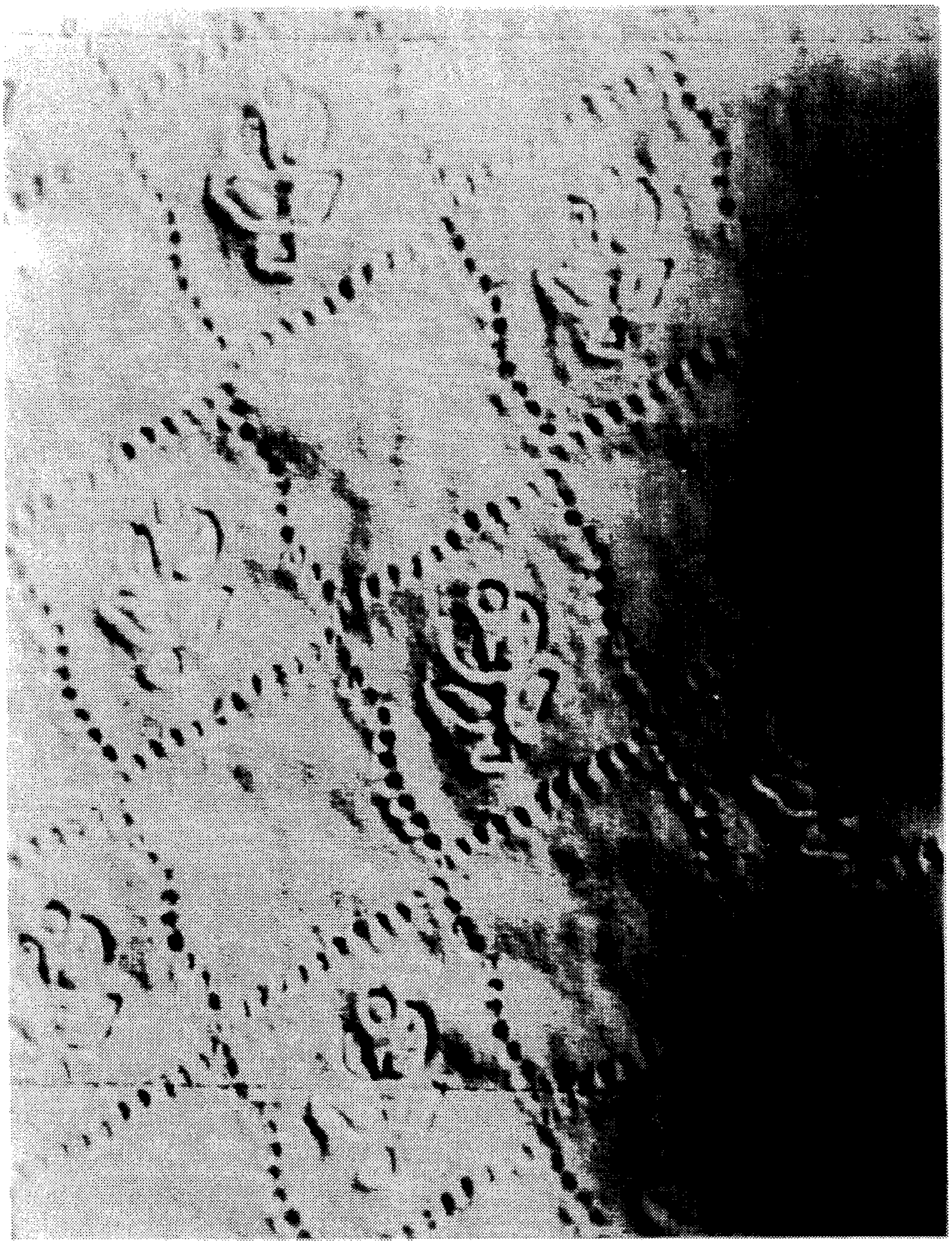
FIG. 8 is an enlargement of the tissue of FIG. 1 clearly illustrating the contrast between the shallow softly rounded stitchlike bosses and the deeper more sharply defined signature bosses.

FIG. 8 is an enlargement of FIG. 1 to clarify the distinct embossing elements. It is clear from FIG. 8 that the signature regions and the stitchlike regions differ, thereby rendering a quiltlike appearance to the tissue.

Figure 9B:
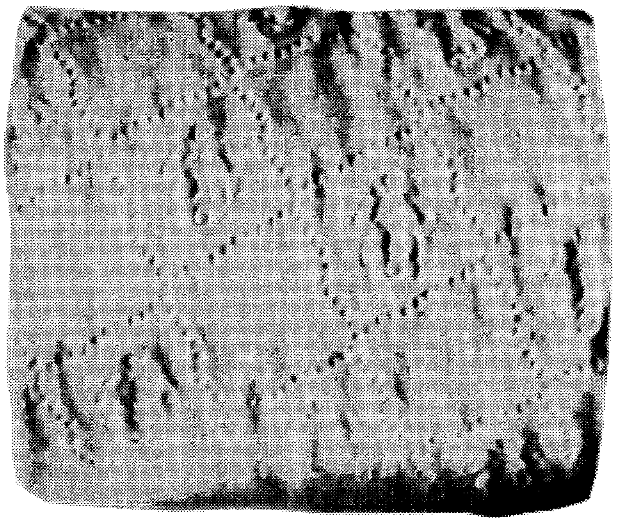
FIG. 9 is an enlarged photograph illustrating the differences in spiral winding between the structure and appearance of a roll of tissue of the present invention and one prior art roll of tissue.
Figure 9A:
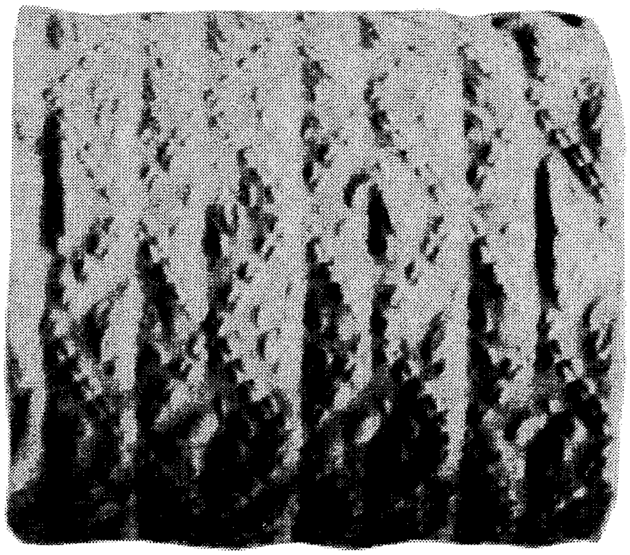

FIG. 9 is a photograph of one embodiment of the present invention side by side with an embodiment of the prior art. This photograph allows observation of decreased ridging in the product of the present invention.

Figure 10:
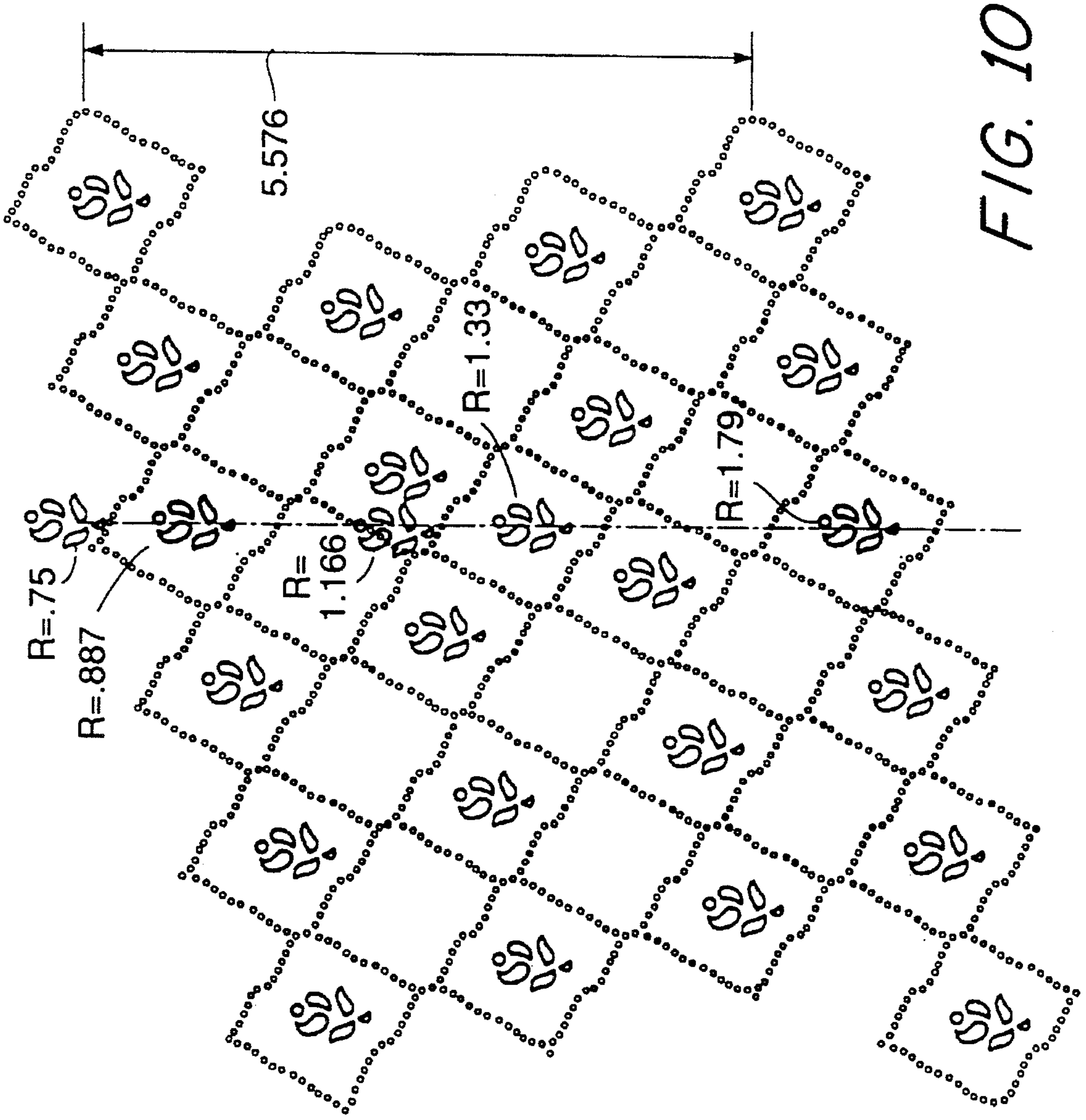
FIG. 10 is an illustrative layout which illustrates the variation in the relative disposition of signature bosses on adjacent layers of tissue as a function of radial distance.

FIG. 10 illustrates the location of adjacent signature bosses on underlying and overlying sheets of the rolled product. The relative positions are indicated at roll radii of 0.75, 0.887, 1.166, 1.33 and 1.79 inches. FIG. 10 also illustrates that, when signatures on underlying and overlying sheets are passing those in the adjacent columns as the roll is filled, the signatures in adjacent columns are just barely superimposed at their very extremities, thus the roll builds uniformly.

Substantial nesting of the signature pattern occurs at a radius of 0.887 inch and 1.79 inches for a roll having a core of 1.5 inches and an outside diameter of 4.2 inches. Based upon core diameter and pattern diameter, calculation of regions of substantial overlap would be readily apparent to the skilled artisan.

Figure 11:
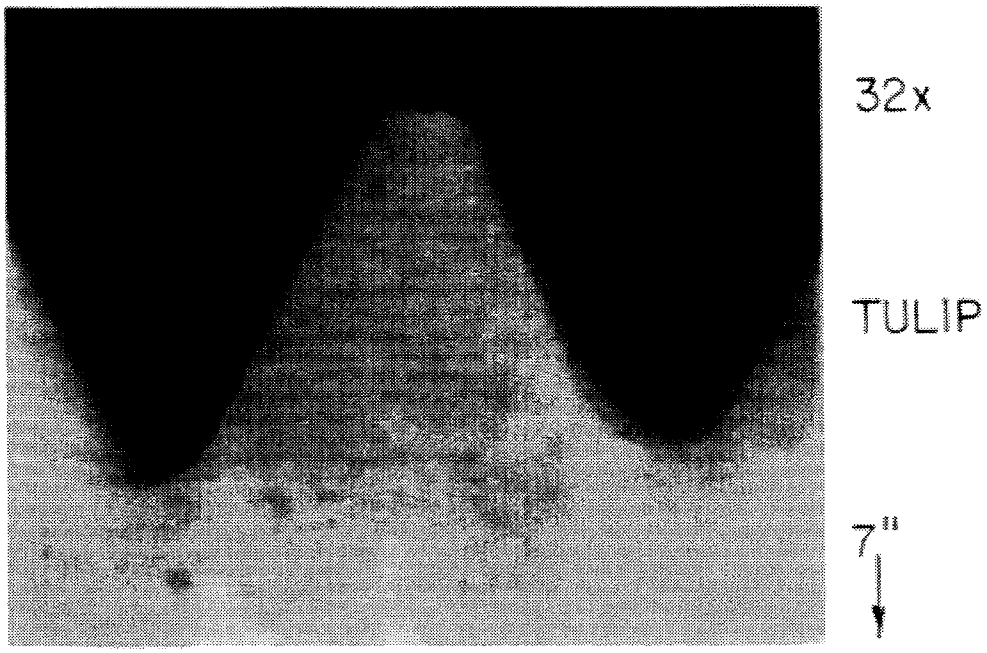
FIG. 11 is an optical photomicrograph illustrating a section through a portion of a tissue sheet bearing a signature boss of a tulip.

FIG. 11 is a photomicrograph of the cross-section of a signature boss. As can be seen, the cross-section is substantially identical to that shown in FIG. 4.

Figure 12:
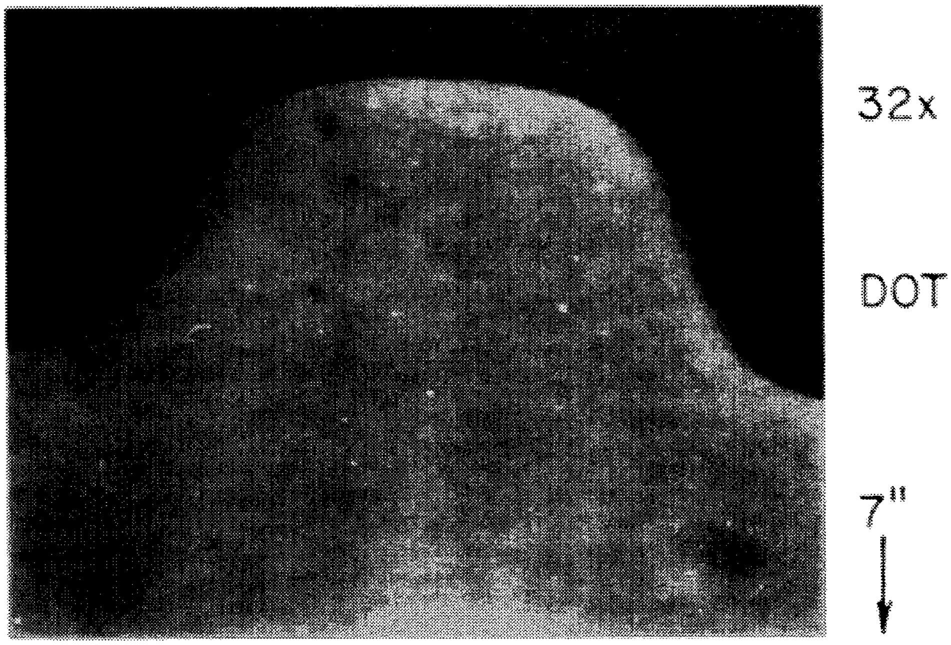
FIG. 12 is an optical photomicrograph illustrating a section through a portion of a tissue sheet bearing a stitchlike boss of a dot.

FIG. 12 is a photomicrograph of the cross-section of a stitchlike boss. As can be seen, the cross-section is substantially identical to that shown in FIG. 3.

Figure 13:
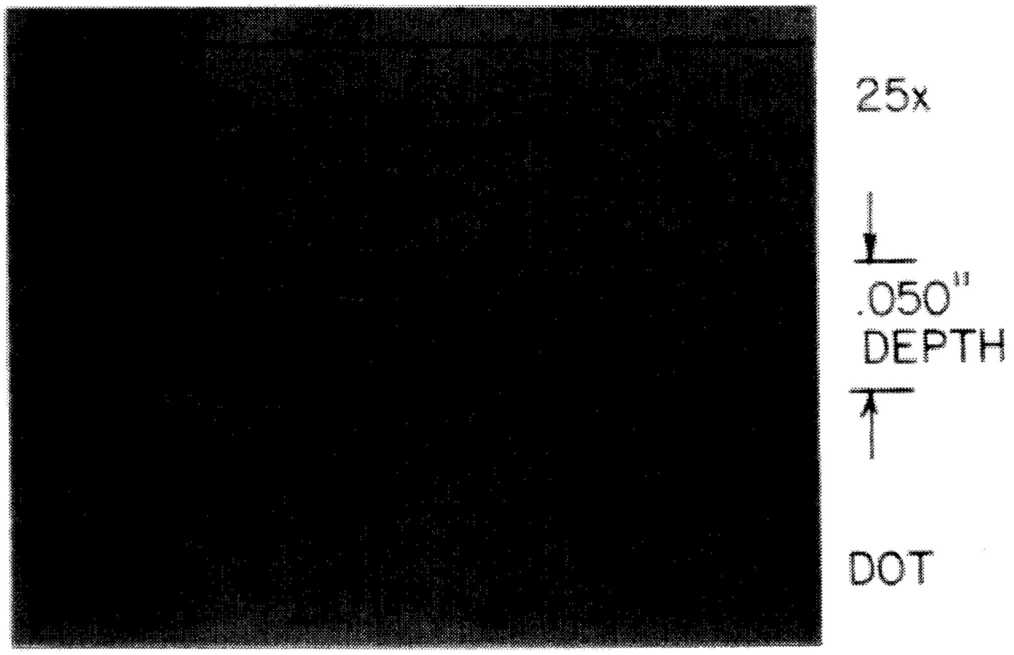
FIG. 13 is an optical photomicrograph illustrating a cross section of a finished sheet bearing a stitchlike boss dot.
Figure 14:
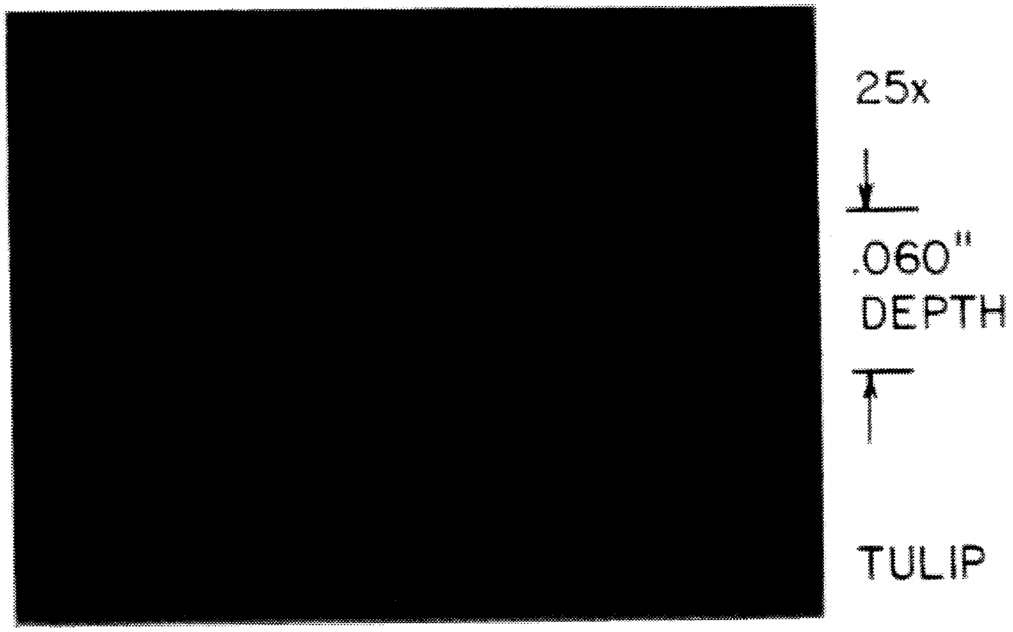
FIG. 14 is an optical photomicrograph illustrating a cross section of a finished sheet bearing a stitchlike boss of a signature boss of a flower.

FIGS. 13 and 14 illustrate the gentler slope and shallower height of the stitchlike boss in FIG. 13 as compared to the steeper slope and deeper embossing of the signature boss of FIG. 14. This combination of the two bosses improves the perception of softness.

Figure 15:
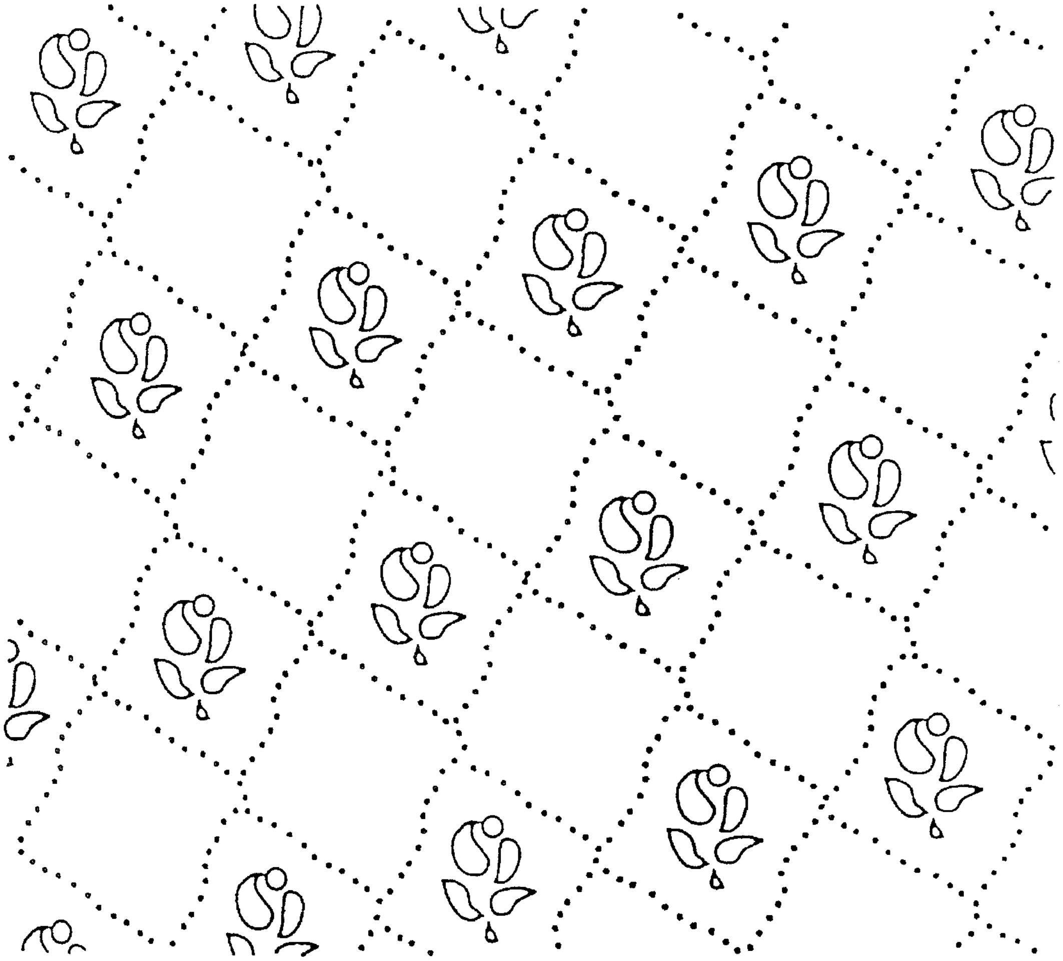
FIG. 15 illustrates the basic design of the present invention as it was displayed for consumer testing, referenced in Examples 1–4.
Figure 16:
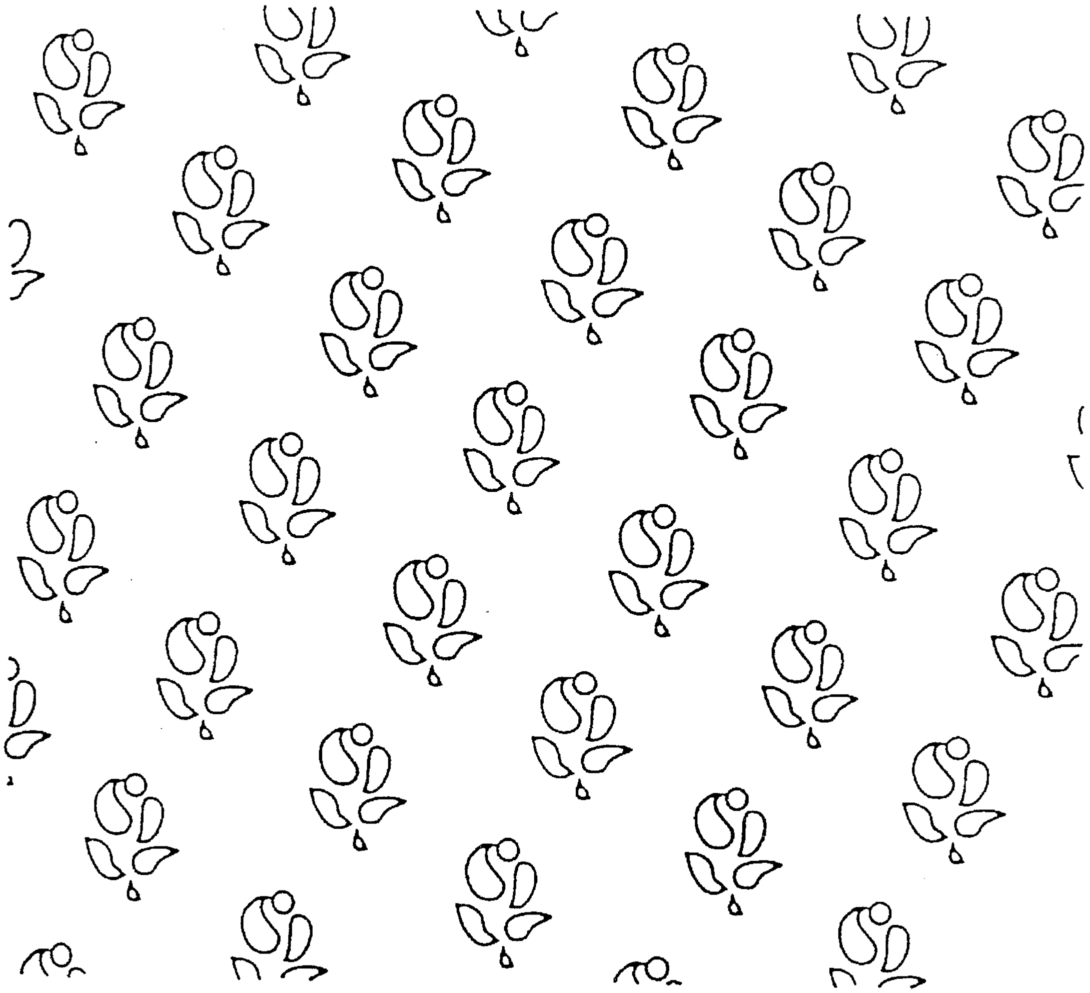
FIG. 16 illustrates the Tulip pattern of the prior art as it was displayed for consumer testing, referenced in Examples 1–4.

FIGS. 15 and 16 illustrate the patterns of the present invention and the prior art, respectively, as they were displayed to the consumers in the Examples which follow.

Figure 17:
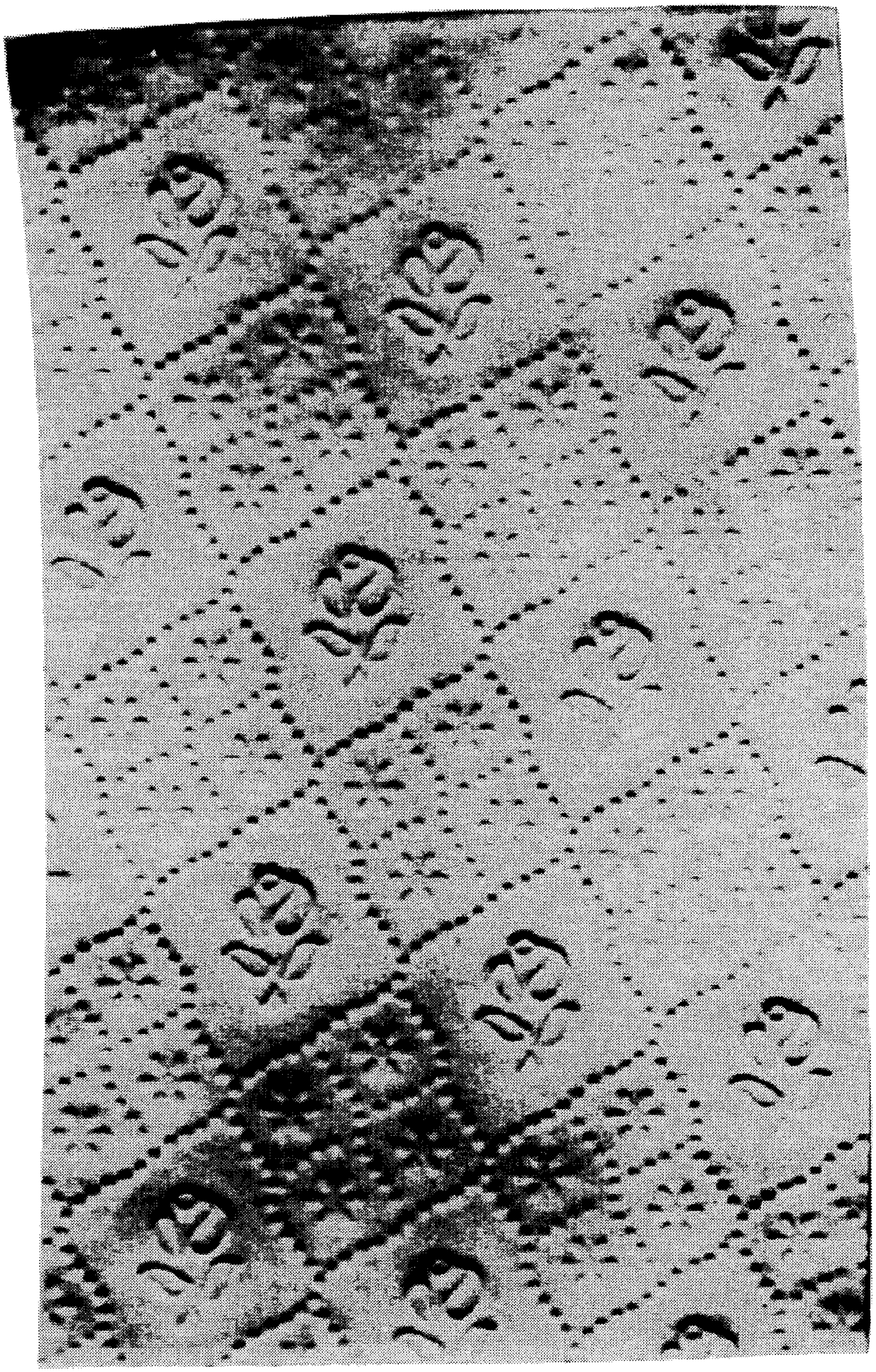
FIG. 17 is a photograph of a single tissue sheet showing stitchlike bosses, signature bosses and finishing bosses.

While an unlimited number of possible boss designs are available, FIG. 17 is an illustrative photograph of a tissue product embossed with one pattern described herein and shows one depiction of the finishing bosses. The signature and finishing bosses in FIG. 17 are distinctive, arbitrary and intended to serve as indicia of origin of the product.

The following examples are not to be construed as limiting the invention as described herein.

EXAMPLES

Consumer perception testing was carried out to rate the quality of the product.

EXAMPLE 1

In this example, market testing was conducted in which the embossed tissue of the present invention as described in the specification, FIG. 15, was compared to prior art tissue marketed under the name NORTHERN BATHROOM TISSUE, having the pattern shown in FIG. 16.

Both base sheets were prepared using a commercial paper machine. Both exhibited substantially similar properties including basis weight, strength and stretch.

| Product | Basis Weight | Caliper | MD Tensile | CD Tensile | % MD Stretch | % CD Stretch |
|---|---|---|---|---|---|---|
| Present Invention | 18.8 | 66.2 | 1068 | 415 | 12.7 | 6.4 |
| Prior Art | 19.33 | 67.9 | 1076 | 367 | 13.6 | 7.9 |
| Present Invention | 18.93 | 69.1 | 1105 | 437 | 18.4 | 7.9 |
| Prior Art | 19.34 | 65.0 | 1133 | 460 | 13.6 | 6.9 |

Softness is not a directly measurable, unambiguous quantity but rather is a somewhat subjective. Bates has reported that the two most important components for predicting perceived softness are roughness and modulus referred to herein as stiffness modulus. See J. D. Bates "Softness Index: Fact or Mirage?," TAPPI, vol. 48, No. 4, Pp. 63A–64A, 1965. For one tissue of the present invention the stiffness modulus was 20.8 and the surface friction was 0.171, while the prior art tissue had a stiffness modulus of 21.2 and a surface friction of 0.156. For another tissues of the present invention the stiffness modulus was 19.1 and the surface friction was 0.165, while the prior art tissue had a stiffness modulus of 23.0 and a surface friction of 0.166. The product according to the present invention was rated improved in softness and comfort.

COMPARATIVE EXAMPLE 2

In this example the emboss pattern of the present invention as seen in FIG. 15 having the same depth of emboss as the tulip pattern set forth in FIG. 16 was tested to determine consumer perception.

| Product | Basis Weight | Caliper | MD Tensile | CD Tensile | % MD Stretch | % CD Stretch |
|---|---|---|---|---|---|---|
| Present Invention | 17.9 | 69.3 | 777 | 391 | 13 | 5 |
| Prior Art | 18.15 | 59.8 | 862 | 458 | 14.8 | 5.5 |
| Present Invention | 18.48 | 68.3 | 1014 | 443 | 17.9 | 6.4 |
| Prior Art | 18.65 | 69.8 | 987 | 456 | 18.7 | 6.2 |

As with Example 1 above, softness was also measured in terms of stiffness modulus and surface friction. The product according to the present invention had a stiffness modulus of 21.1 and a surface friction of 0.175, while the prior art tissue had a stiffness modulus of 21.3 and a surface friction of 0.155.

The product according to the present invention was not rated as not being improved in softness at this depth of emboss.

COMPARATIVE EXAMPLE 3

In Example 3, the emboss roll was heavily brushed to round the edges. The base sheets were again prepared using a commercial paper machine. Both exhibited substantially similar properties including basis weight, strength and stretch.

-continued

| Product | Basis Weight | Caliper | MD Tensile | CD Tensile | % MD Stretch | % CD Stretch |
|---|---|---|---|---|---|---|
| Present Invention Heavy Brushing | 18.38 | 69.1 | 755 | 352 | 11.6 | 5.3 |
| Present Invention Normal Brushing | 18.12 | 64.8 | 670 | 371 | 10.7 | 5.2 |

As with Example 1 above, softness was also measured in terms of stiffness modulus and surface friction. The product according to the present invention with heavy brushing had a stiffness modulus of 21.6 and a surface friction of 0.184, while the tissue with normal brushing had a stiffness modulus of 22.1 and a surface friction of 0.165. The product tested was rated improved when heavy brushing was applied to the emboss roll.

EXAMPLE 4

Example 4 was prepared after capping all of the stitchlike emboss areas on the emboss roll. "Capping" refers to a process whereby the stitchlike areas of the emboss are rounded to create an emboss pattern which is less sharp. The base sheets were again prepared using a commercial paper machine. Both exhibited substantially similar properties including basis weight, strength and stretch.

| Product | Basis Weight | Caliper | MD Tensile | CD Tensile | % MD Stretch | % CD Stretch |
|---|---|---|---|---|---|---|
| Present Invention | 18.28 | 66.8 | 797 | 376 | 15.0 | 5.0 |
| Prior Art | 18.18 | 68.8 | 740 | 357 | 14.9 | 6.4 |
| Present Invention | 18.02 | 58.5 | 767 | 404 | 15.4 | 4.5 |
| Prior Art | 17.95 | 64.3 | 770 | 380 | 14.1 | 5.0 |
| Present Invention | 18.28 | 66.8 | 797 | 376 | 15.0 | 5.0 |
| Prior Art | 18.04 | 66.3 | 797 | 406 | 14.0 | 5.1 |

As with Example 1 above, softness was also measured in terms of stiffness modulus and surface friction. One product according to the present invention had a stiffness modulus of 21.7 and a surface friction of 0.168, while one prior art tissue had a stiffness modulus of 17.4 and a surface friction of 0.166. A second product according to the present invention had a stiffness modulus of 25.5 and a surface friction of 0.157, while a second prior art tissue had a stiffness modulus of 21.9 and a surface friction of 0.167. A final tested product according to the present invention had a stiffness modulus of 21.7 and a surface friction of 0.168, while a final prior art tissue tested had a stiffness modulus of 22.8 and a surface friction of 0.172.

The product of the present invention was rated improved in softness and comfort.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A nonwoven fibrous web having a machine direction and a cross direction, with the machine direction extending substantially parallel to a free edge of the web, and having a plurality of bosses formed therein comprising:

a pattern which is made up of uniform stitch shaped bosses to form polygonal cells which make up a lattice structure; and a pattern which is made up of signature bosses which fill at least some of the cells;

wherein the combination of lattice structure and signature bosses are offset from the machine direction.

2. The web according to claim 1, wherein the pattern is offset from about 15 to 65 degrees from the machine direction.

3. The web according to claim 1, wherein said web is adapted for spiral wrapping into a roll, and said bosses are configured such that substantial nesting of said signature bosses on a roll occurs at a maximum of two locations.

4. The web according to claim 1, wherein the area of the stitchlike bosses is no greater than 10% of the area of said web.

5. The web according to claim 1, wherein the area of the stitchlike bosses is no greater than 5% of the area of said web.

6. The web according to claim 1, wherein the area of the signature bosses is no greater than 5% of the area of said web.

7. The web according to claim 1, wherein the area of the signature bosses is no greater than 4% of the area of said web.

8. The web according to claim 1, further comprising finishing bosses which are located in a least some of the polygonal cells which are not occupied by the signature bosses.

9. The web according to claim 1, wherein the area of the finishing bosses is no greater than 20% of the area of said web.

10. The web according to claim 1, wherein the total area of bosses is no greater than 35% of the area of the web.

11. The web according to claim 1, wherein the signature bosses have a depth of about 0.060 inch.

12. The web according to claim 1, wherein the stitchlike bosses have a depth of about 0.050 inch.

13. The web according to claim 8, wherein the finishing bosses have a depth of about 0.040 inch.

14. The web according to claim 11, wherein the signature bosses have an apex diameter of about 0.020 inch.

15. The web according to claim 1, wherein the polygonal cells frame the signature bosses.

16. The web according to claim 1, wherein each polygonal cell has sides and adjacent each side of each cell containing a signature boss is a cell which does not contain a signature boss.

17. The web according to claim 15, wherein the adjacent cells which do not contain a signature boss, contain a finishing boss.

18. The web according to claim 1, wherein said signature boss is separated from the stitchlike boss forming said lattice pattern by at least 3 diameters of said stitchlike boss.

19. The web according to claim 1, wherein the diameter of the stitchlike boss is at least one and one half times the width of a line of the signature boss.

20. The web according to claim 1, wherein the diameter of the stitchlike boss is at least twice the width of a line of the signature boss.

21. The web according to claim 1, wherein the diameter of the stitchlike boss is at least three times the width of a line of the signature boss.

22. The web according to claim 1, wherein said polygonal cells are diamond shaped cells.

23. The web according to claim 1, wherein said web is approximately 3 polygonal cells wide.

24. The web according to claim 1, wherein said polygonal cells have side walls and the length of the side walls of the polygonal cells is about 1.125 in.

25. The web according to claim 1, wherein the polygonal cells have inclusion angles and the inclusion angles for the polygonal cells are about 77° and 103°.

26. The web according to claim 1, wherein said web has a machine direction and a cross direction and the signature bosses are aligned at angles of 53.6° counterclockwise, 15.0° counterclockwise, 24° clockwise and 75.5° clockwise from the machine direction of the web.

27. The web according to claim 1, wherein the polygonal cells have generator lines which connect the apices of the polygonal cells, and wherein the center of the stitchlike boss farthest from the generator line is a distance equivalent to at least 1 diameter of said stitchlike boss but no more than 3 diameters of said stitchlike boss from said line.

28. The web according to claim 27, wherein said array of stitchlike bosses coincides with said generator line at least 2 times between apices.

29. The web according to claim 1, wherein the stitchlike bosses are substantially circular dots.

30. The web according to claim 1, wherein the stitchlike bosses resemble dashes.

31. The web according to claim 30, wherein the dashes have an aspect ratio of less than 5.

32. The web according to claim 31, wherein said aspect ratio is between 3 and 5.

33. The web according to claim 1, wherein the polygonal cells are hexagonal cells.

34. The web according to claim 1, wherein the polygonal cells are octagonal cells.

35. A non woven fibrous web having a lattice pattern defined by an array of stitch shaped bosses which have a height, are encompassed by downwardly flaring regions, and form a plurality of polygonal cells, a substantial fraction, less than all, of said polygonal cells having therein a signature boss having a height exceeding that of said stitch shaped bosses and being encompassed by a downwardly flaring region more steeply inclined than the downwardly flaring regions of said stitch shaped bosses.

36. The web according to claim 35, wherein said web is adapted for spiral wrapping into a roll, and said bosses are configured such that substantial nesting of said signature bosses on a roll occurs at a maximum of two locations.

37. The web according to claim 35, wherein the area of stitchlike bosses is no greater than 10% of the area of said web.

38. The web according to claim 35, wherein the area of stitchlike bosses is no greater than 5% of the area of said web.

39. The web according to claim 35, wherein the total area of bosses is no greater than 20% of the area of said web.

40. The web according to claim 35, wherein said signature bosses are a plurality of closed segments.

41. The web according to claim 35, wherein the stitchlike bosses have a height of about 0.050 inch.

42. The web according to claim 35, wherein the signature bosses have a height of about 0.060 inch and an apex diameter of about 0.020 inch.

43. The web according to claim 35, wherein the polygonal cells frame the signature bosses.

44. The web according to claim 35, wherein each polygonal cell has sides and adjacent each side of each cell containing a signature boss are cells which do not contain a signature boss.

45. The web according to claim 35, wherein said signature boss is separated from the stitchlike boss forming said lattice pattern by at least 3 diameters of said stitchlike bosses.

46. The web according to claim 35, wherein the diameter of the stitchlike boss is at least one and one half times the width of the signature line.

47. The web according to claim 35, wherein the diameter of the stitchlike boss is at least twice the width of the signature line.

48. The web according to claim 35, wherein the diameter of the stitchlike boss is at least three times the width of the signature line.

49. The web according to claim 35, wherein said polygonal cells are diamond shaped cells.

50. The web according to claim 35, wherein said web is approximately 3 polygonal cells wide.

51. The web according to claim 35, wherein said polygonal cells have side walls and the length of the side walls of the polygonal cells is about 1.125 in.

52. The web according to claim 35, wherein the polygonal cells have inclusion angles and the inclusion angles for the polygonal cells are about 77° and 103°.

53. The web according to claim 35, wherein said web has a machine direction and a cross direction and the signature bosses are aligned at angles of 53.6° counterclockwise, 15.0° counterclockwise, 24° clockwise and 75.5° clockwise from the machine direction of the web.

54. The web according to claim 35, wherein the polygonal cells have generator lines which connect the apices of the polygonal cells and the center of the farthest stitchlike boss is a distance equivalent to at least 1 diameter of said stitchlike boss but no more than 3 diameters of said stitchlike boss from the line generating the polygonal cell.

55. The web according to claim 54, wherein said array of stitchlike bosses coincides with said generators at least 2 times between apices.

56. The web according to claim 35, wherein the stitchlike bosses are substantially circular dots.

57. The web according to claim 35, wherein the stitchlike bosses resemble dashes.

58. The web according to claim 54, wherein the dashes have an aspect ratio of less than 5.

59. The web according to claim 58, wherein said aspect ratio is between 3 and 5.

60. The web according to claim 35, wherein the polygonal cells are hexagonal cells.

61. The web according to claim 35, wherein the polygonal cells are octagonal cells.

62. A sheet of tissue having a plurality of bosses formed therein defining a lattice pattern comprising a plurality of polygonal cells, a fraction, more than one-third, but less than two-thirds, of said polygonal cells having therein a signature boss, said lattice pattern being defined by an array of stitch shaped bosses arranged to form said lattice pattern, wherein said stitch shaped bosses are encompassed by arcuate regions having a cross-sectional radii of curvature exceeding that of said signature boss which has a height exceeding the height of said stitch shaped boss.

63. A sheet of tissue having a plurality of bosses formed therein defining a lattice pattern having a plurality of polygonal cells, a fraction, more than one-third but less than two-thirds, of said polygonal cells being filled with a signature boss, said lattice pattern having generators and being defined by a sinuous array of stitch shaped bosses undulating about the generators of said lattice pattern, said stitch shaped bosses being encompassed by rotund arcuate regions having cross-sectional radii of curvature exceeding at least about 0.015 inch; said signature being comprised of a plurality of elongated bosses having a height of boss exceed the height of boss of said stitch shaped bosses by at least 0.003 inch, said elongate bosses being encompassed by arcuate regions having cross-sectional radii of curvature of not more than 50% of the average radius of curvature of the arcuate regions encompassing said stitch shaped bosses.

64. A roll of embossed tissue having a plurality of bosses formed therein, said bosses comprising:

two series of intersecting sinuous lines of stitch shaped bosses, one series of lines being disposed at a first acute angle clockwise of the machine direction of the roll, the other series of lines being disposed at a second acute angle counterclockwise of the machine direction of the roll whereby a repeating pattern comprising an oblique lattice of substantially uniform staggered wavy diamonds is defined;

a plurality of signature bosses centrally located within alternating rows of said diamond, the disposition of said bosses being configured such that substantial nesting of said signature bossed on said roll occurs at a maximum of two locations on said roll, the outermost of said locations being spaced at least 1/32 inch below the exterior surface of said roll and, the innermost, at least 0.5 inch inward from said outermost substantial nesting location.

65. The roll of embossed tissue of claim 64, wherein, between said outermost nesting location and said innermost nesting location, signature bosses do not overlap each other over an area corresponding to at least 40% of the volume of said roll.

66. A roll of embossed tissue having a plurality of bosses formed therein, said bosses comprising;

two equally spaced series of intersecting sinuous lines of stitch shaped bosses, one series of lines being disposed at a first acute angle clockwise of the machine direction of the roll, the other series of lines being disposed at a second acute angle counterclockwise of the roll whereby an oblique lattice of substantially uniform staggered wavy diamonds is defined;

a plurality of signature bosses centrally located within alternating rows of said diamond, the disposition of said bosses being configured such that, adjacent to the surface of said roll, signature bosses on closely adjacent overlapping repeats are displaced from each other by at least 0.50 inch in the machine direction.

67. The roll of embossed tissue of claim 66, wherein signature bosses do not overlap each other over a contiguous area corresponding to at least 40% of the volume of said roll.

68. The roll of embossed tissue of claim 66, wherein signature bosses do not overlap each other over a total area corresponding to at least 60% of the volume of said roll.

69. The roll of embossed tissue of claim 66, wherein the overall average percentage embossed areas are substantially equal in each machine direction strip of said roll.

* * * * *

UNITED STATES PATENT AND TRADEMARK OFFICE
CERTIFICATE OF CORRECTION

PATENT NO.: 5,597,639

DATED: January 28, 1997

INVENTOR(S): Galyn A. SCHULZ

It is certified that an error appears in the above-identified patent and that said Letters Patent is hereby corrected as shown below:

Claim 58, col. 15, line 35, change "claim 54" to --claim 57--.

Signed and Sealed this

Fifteenth Day of April, 1997

Attest:

BRUCE LEHMAN

*Attesting Officer* *Commissioner of Patents and Trademarks*

UNITED STATES PATENT AND TRADEMARK OFFICE

Certificate

Patent No. 5,597,639 Patented: January 28, 1997

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Edward J. Giesler, Sr., Suamico, WI and Gaylyn A. Schulz, Appleton, WI.

Signed and Sealed this Twenty-First Day of March, 2000.

ELLIS P. ROBINSON
Supervisory Patent Examiner,
Art Unit 1772